June 6, 1967  O. C. LEE  3,323,776
CHAIN DRAW HAVING PIVOTED LEVER MEANS
Filed Oct. 22, 1965

INVENTOR
OSCAR C. LEE
BY
ATTORNEY

3,323,776
CHAIN DRAW HAVING PIVOTED LEVER MEANS
Oscar C. Lee, River Falls, Wis. 54022
Filed Oct. 22, 1965, Ser. No. 501,553
2 Claims. (Cl. 254—78)

This application relates to a chain draw for use in tightening chains while links are being replaced, for maintaining fencing in stretched relationship while being secured to posts, and for similar purposes.

There has been a continuing problem in finding a device suitable for holding chains or fencing in a taut relation while links were being replaced or the fence was being secured to fence posts. Similarly, there has been a problem in holding certain types of spring clamps in compressed relationship while hoses are being replaced, or of holding certain clamps in spread relationship against compressive tension while work was being done.

To illustrate, the normal way of stretching fencing while it is being erected is to use a series of pulleys. Obviously, this is extremely tedious and requires a considerable amount of equipment and quite generally at least two operators if the work is going to be successful. Similarly in replacing links in a chain it is normally necessary to remove the chain from the rollers on which it is secured in order to replace the link.

It is an object of my invention to provide a relatively simple tool which has adaptability for a variety of engaging means secured to the ends of a pair of crossed levers and having locking means to hold the crossed levers in fixed spaced relation.

It is a further object of the present invention to provide a tool which may be made in a variety of sizes so as to be usable for light work such as bicycle chains, and to be equally usable for heavy work such as the large chains which are used to drive rollers in feed mills and the like.

It is a further object of the present invention to provide a slidable locked lug engageable in notches of a plate, the notches being radially spaced around the periphery of the plate to provide a multiplicity of fixed relationships for the crossed lever arms.

In the preferred construction, the notched plate is secured to one lever arm at the point where the arms are pivotally secured together in side by side relationship while the locking lug is slidably secured on the other arm. The locking lug has an offset portion of a size to be engaged in a notch of the plate so that when the arms are at a desired point, the lug may be engaged in the notch to hold them in that position.

As previously mentioned, a variety of engaging means may be secured to the ends of the arms such as hooks, for example, to fit the particular work being undertaken.

It will be understood that the arms are movable toward or away from each other thereby enabling the arms to be used for pushing or pulling against the work pieces.

These and other objects and particular advantages will be more particularly described and detailed in the accompanying specification taken in conjunction with the drawings herein, in which.

Figure 1:
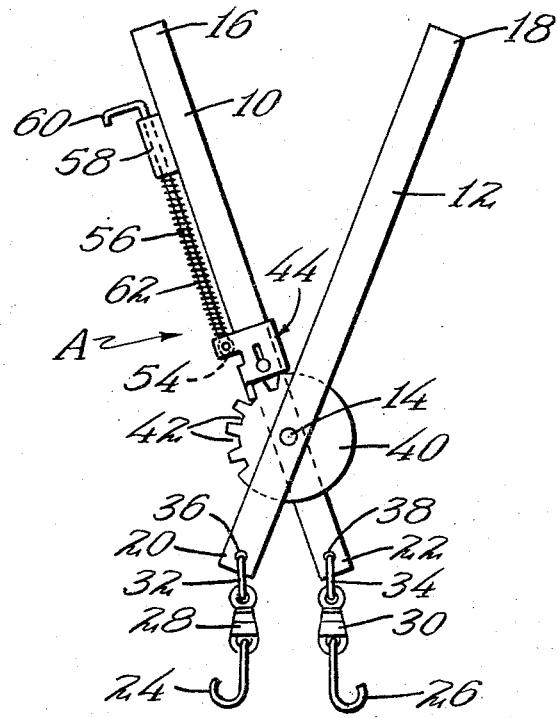
FIGURE 1 is a view in elevation of my chain draw.

FIGURE 1 discloses a chain draw A having a pair of elongated lever arms 10 and 12 which are pivotally secured together by a rivet or any other suitable means such as a bolt as indicated at 14. The point of pivotal engagement 14 is preferably closer to one end of the arms 10 and 12 than to the other ends of the arms to provide increased leverage as will be understood.

The lever arms are preferably of steel although various alloys will be of course suitable, and outer coverings may be provided for the purposes of insulation, if desired. However, as these modifications are believed obvious no further description of these is believed necessary.

The crossed lever arms 10 and 12 have handle ends 16 and 18 and working ends 20 and 22 to accommodate work pieces.

Engaging means such as the hooks 24 and 26 may be secured to the working ends 20 and 22 either in fixed relation or by means of snaps 28 and 30 secured to rings 32 and 34 which pass through apertures 36 and 38 in the working ends of the lever arms.

Obviously, the type of hooks or engaging members employed will depend upon the type of work being done and the hooks shown are for the purposes of illustration and not in limitation.

In the preferred construction, a plate 40 having a series of peripheral notches 42 is secured in fixed relation to one of the lever arms adjacent the pivot point and movable with the set lever arm. As will appear from the view in FIGURE 1, the plate may be placed intermediate the arms 10 and 12. In this position the plate acts as a spacer between the arms, the plate being secured to the one lever arm by any suitable means such as welding.

It will be understood that the rivet or bolt 14 passes through an aperture (not shown) which extends through the two arms and the plate.

A locking lug 42 is slidably secured on the other lever arm between the handle end such as 16 and the plate 40 so as to be able to move toward and away from the plate.

Figure 2:
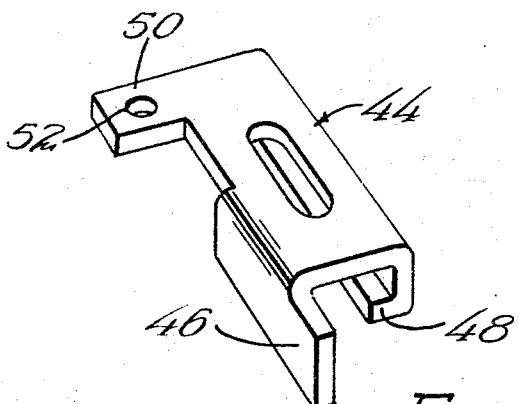
FIGURE 2 is a perspective view of the locking member.

The locking lug may be more clearly seen in FIGURE 2. In the preferred construction the locking lug comprises a generally C-shaped channel member having a laterally offset notch engaging portion 46 which extends laterally and forwardly of the body of the C-shaped channel member so as to provide a portion to engage in the notches 42. The opposed portion of the channel member is counter turned as indicated in 48 to provide a portion of the channel to hold the locking member on the lever arm. At the opposite end of the channel member a flange portion 50 is provided having an aperture 52 through which one end 54 of a push rod 56 is engaged. The push rod is supported in generally parallel relation to the lever arm 10 by a bearing member 58. The other end of the push rod has a handle member 60 designed to be engaged by one or more fingers of the user of the chain draw and in the preferred construction comprises an angled extension.

In use the handle ends 16 and 18 of the lever arms are grasped and are moved toward or away from each other. This movement of the lever arms produces similar movement of the other ends of the lever arms which engage the work pieces. When the lever arms are in the desired position, the push rod is slid forwardly to cause the offset lug to engage in a notch 42 to hold the arms in fixed relation.

A spring or resilient member 62 may be provided to cause the push rod to constantly urge itself into engagement with the locking member and in turn with the notched plate. To release the locked arms, the push rod is retracted toward the handle end 16 which permits the arms 10 and 12 to be freely rotated.

Turning again to the working ends 20 and 22, it will be understood that the engaging ends may be fixedly secured to the ends 20 and 22 or may be as illustrated. However, the principle of operation will remain the same.

Because the arms may be provided with extensions if desired such as pieces of pipe, it is possible to exert tremendous leverage by means of the arms and to lock them in a fixed position of leverage. Accordingly, one man by providing a plurality of hooks rather than the two as shown may use one set of hooks to engage a fence post and the other set of hooks in spaced relation to engage a fence and readily pull it to a taut position before engaging it to the post. Similarly, one man may readily replace the links of a chain without having the chain removed from the rollers or cog wheels to which the chain is attached.

In accordance with the patent office statutes, I have set forth the best embodiment of my invention, but I desire to have it understood that obvious changes may be made within the scope of the accompanying claims without departing from the spirit of my invention.

I claim:
1. A chain draw comprising:
   a pair of generally straight elongated lever arms in crossed side by side relation,
   said arms pivotally secured together at a point more closely adjacent one end of said arms than the other end of said arms,
   a generally circular plate centrally fixed to one said lever arm at said pivot point in generally parallel relation to said pair of lever arms,
   said plate having a generally semicircular portion extending above said lever arm,
   said semicircular portion having a series of radially spaced peripheral notches,
   a generally C-shaped channel member having a laterally extending lug portion slidably secured on said other arm,
   said C-shaped member lug portion being of a width adapted to engage a said peripheral notch when said channel member is urged to a point adjacent said plate,
   a push rod having a secured end and a handle end slidably positioned in a bearing member fixed on said other arm in generally parallel relation to said other arm,
   said push rod secured end being secured to said channel member,
   a generally helical spring on said push rod intermediate said channel member and said bearing member whereby said channel member is urged toward engagement with a said notch,
   hook means secured to said one end of said arms to engage a workpiece.

2. The structure of claim 1 and in which said plate is intermediate said crossed lever arms.

References Cited

UNITED STATES PATENTS

| 401,857 | 4/1889 | Rogers | 254—78 |
| 838,514 | 12/1906 | Baker | 81—323 X |
| 1,276,815 | 8/1918 | Ruthren | 254—78 |
| 2,380,781 | 7/1945 | Osborne | 254—78 |

WILLIAM FELDMAN, *Primary Examiner.*

MILTON S. MEHR, *Examiner.*